(12) United States Patent
Suetake (10) Patent No.: US 6,708,266 B2
(45) Date of Patent: Mar. 16, 2004

(54) CENTRAL PROCESSING UNIT AND SYSTEM COUNTING INSTRUCTIONS IN A QUEUE STORAGE AND OUTPUTTING A FETCH REQUEST WHEN THE COUNT VALUE IS 0 OR 1 TO PRODUCE A NEXT INSTRUCTION ADDRESS OUTPUT

(75) Inventor: Seiji Suetake, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 493 days.

(21) Appl. No.: 09/768,297

(22) Filed: Jan. 25, 2001

(65) Prior Publication Data

US 2001/0011340 A1 Aug. 2, 2001

(30) Foreign Application Priority Data

Feb. 1, 2000 (JP) ........................................ 2000-024408

(51) Int. Cl.[7] ................................................. G06F 9/30
(52) U.S. Cl. ...................... 712/207; 712/205; 711/109; 711/213; 711/220

(58) Field of Search ................................. 711/109, 213, 711/218, 219, 220; 712/205, 207

(56) References Cited

U.S. PATENT DOCUMENTS 4,924,376 A * 5/1990 Ooi ............................ 712/207
5,313,600 A * 5/1994 Kasai ......................... 712/207
6,009,508 A * 12/1999 May et al. .................... 712/41

FOREIGN PATENT DOCUMENTS

JP          2000-148478       5/2000

* cited by examiner

*Primary Examiner*—Kenneth S. Kim
(74) *Attorney, Agent, or Firm*—Staas & Halsey LLP

(57) ABSTRACT

The central processing unit is provided with an instruction queue storage section. This central processing unit is made of a memory, such as FIFO memory, that adopts first-in first-out method. A counter counters each time an instruction datum is stored in the instruction queue storage section. When the value of the counter is 0 or 1 and instruction fetch is not suppressed, a fetch request is issued.

8 Claims, 12 Drawing Sheets

CENTRAL PROCESSING UNIT AND SYSTEM COUNTING INSTRUCTIONS IN A QUEUE STORAGE AND OUTPUTTING A FETCH REQUEST WHEN THE COUNT VALUE IS 0 OR 1 TO PRODUCE A NEXT INSTRUCTION ADDRESS OUTPUT

FIELD OF THE INVENTION

The present invention relates to an central processing unit that uses address first-out method and has an advance fetching function. This invention also relates to a central processing system which adopts the above-mentioned central processing unit. The central processing unit (hereafter, CPU) conducts control, arithmetic operation and the like based on an instruction and data read from a main storage device.

BACKGROUND OF THE INVENTION

Generally, the processing speed of the CPU is higher than that for reading the instruction and data from the main storage device. Accordingly, a high speed cache is provided between the CPU and the main storage device to store instructions which were previously referred to. Also, in a system which does not comprise a cache, an instruction queue storage section which reads an instruction at an address prior to that of the information read by the CPU is provided.

Figure 1:
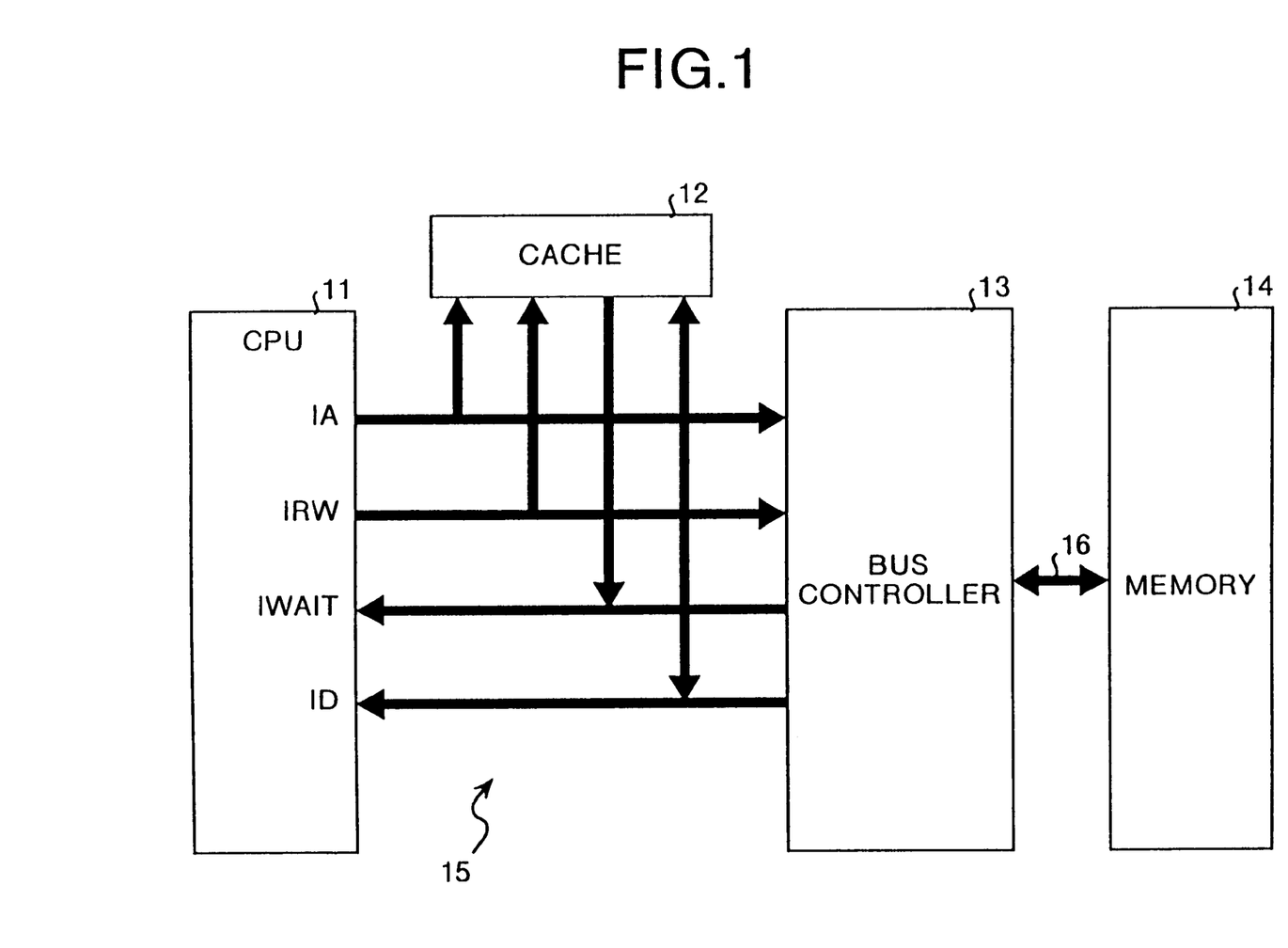
FIG. 1 is a block diagram showing the important constituent elements of an ordinary central processing system.

FIG. 1 is a block diagram showing the important constituent elements of an ordinary central processing system. This central processing system comprises a CPU 11, a cache 12, a bus controller 13 and a memory 14. The CPU 11, the cache 12 and the bus controller 13 are mutually connected through instruction buses 15 (for signals IA, IRW, IWAIT and ID). The memory 14 is connected to the bus controller 13 through a bus 16.

The CPU 11 outputs an instruction address IA and a read request signal IRW to the cache 12 and the bus controller 13. Furthermore, the CPU 11 receives a wait signal IWAIT or instruction data ID from the cache 12 and the bus controller 13.

Figure 2:
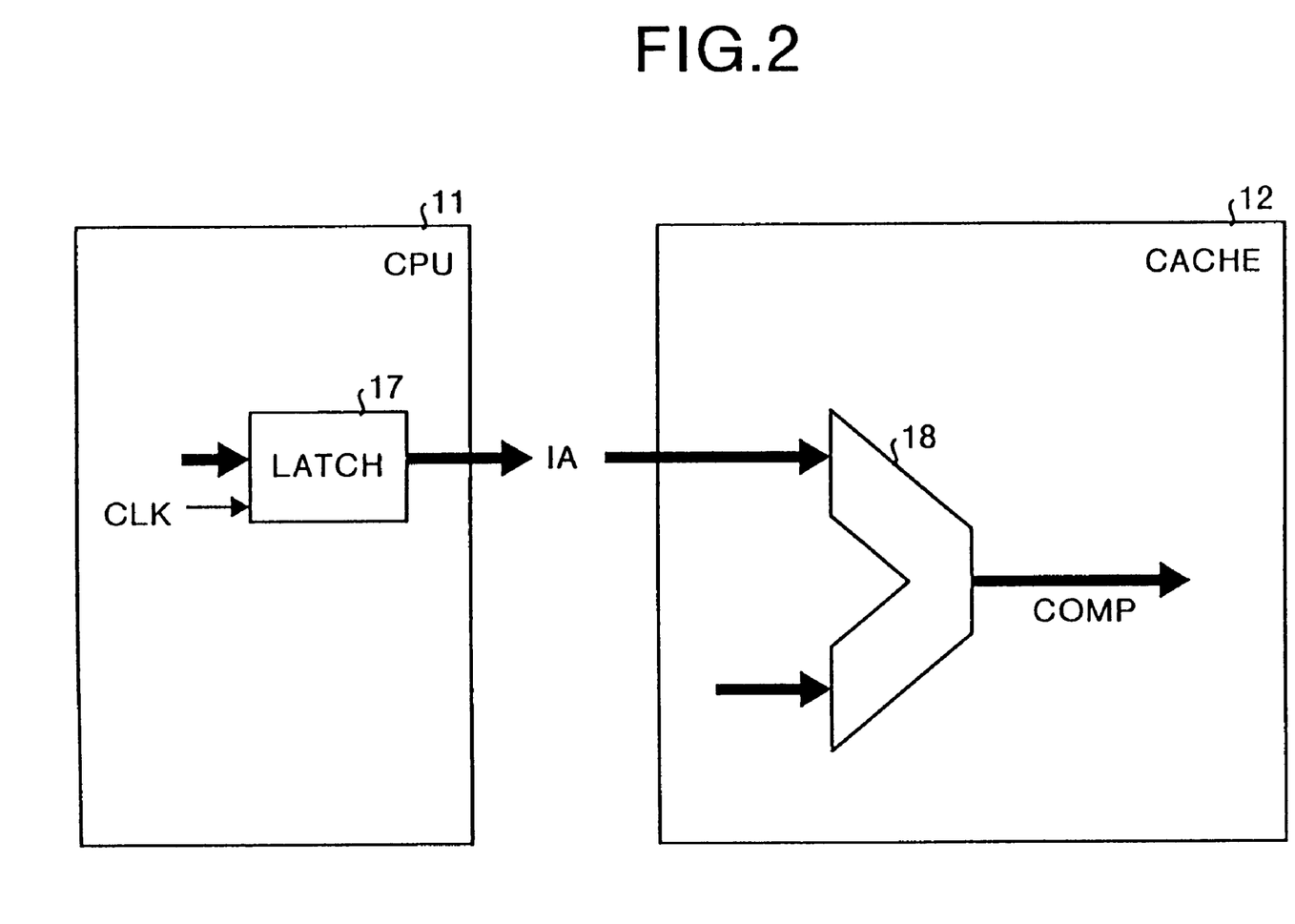
FIG. 2 is a block diagram showing the important constituent elements of a conventional central processing system which elements relate to the instruction address of a CPU and a cache.

FIG. 2 is a block diagram showing the important constituent elements of a conventional central processing system which elements relate to the instruction address of the CPU and the cache. Conventionally, the CPU 11 latches the instruction address IA output from an address adder (not shown) using a latch 17 in the CPU 11 at timing at which a clock CLK rises, and outputs the instruction address IA to the cache 12. A comparator 18 in the cache 12 compares the instruction address IA output from the CPU 11 with the address of the instruction data ID stored in the cache 12. The comparison result COMP generated by the comparator 18 is used to generate the wait signal IWAIT.

Figure 3:
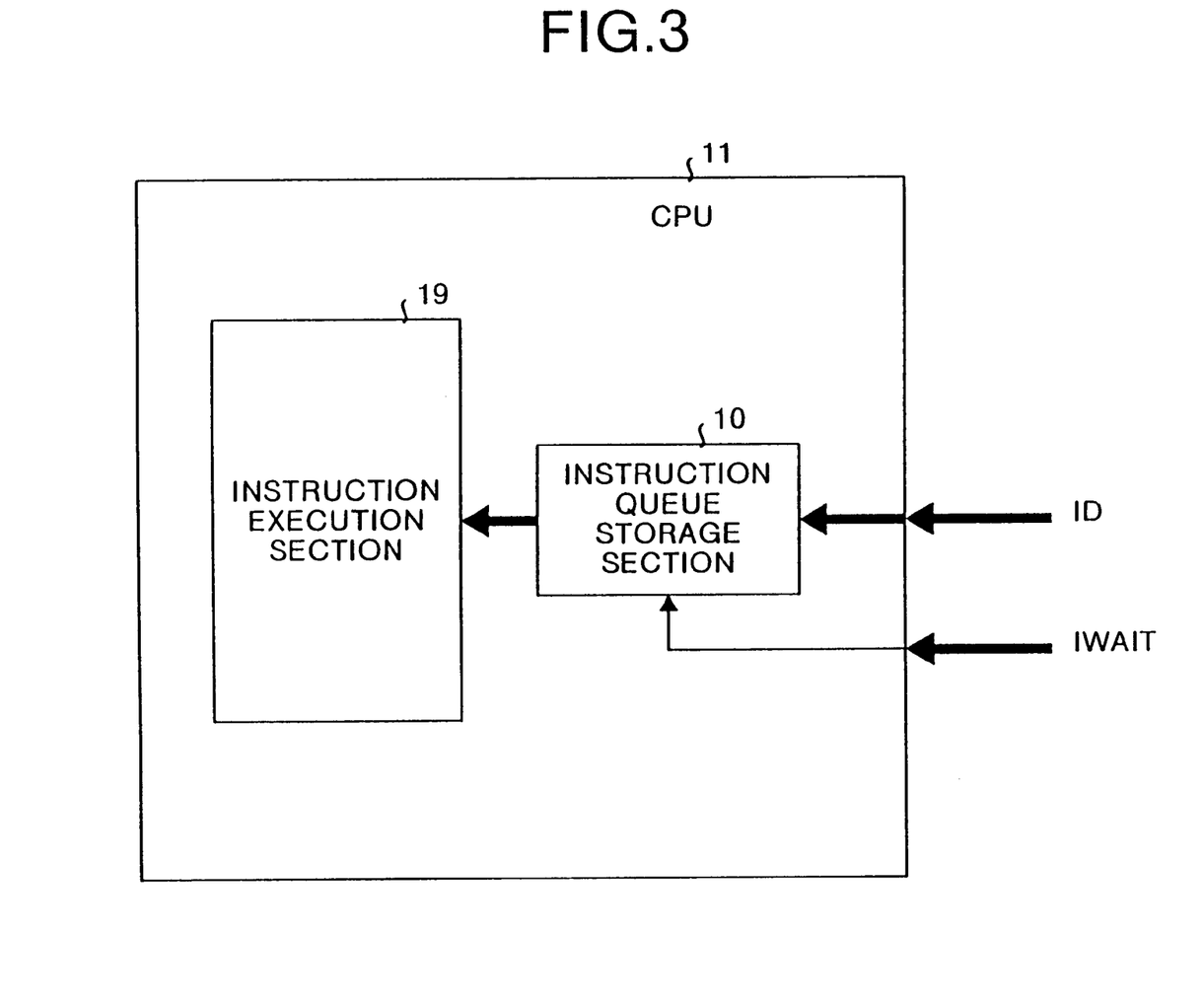
FIG. 3 is a block diagram showing the important constituent elements of the conventional central processing system which elements relate to the instruction data of the CPU.

FIG. 3 is a block diagram showing the important constituent elements of the central processing system which elements relate to the instruction data of the CPU. Conventionally, the instruction data ID output from the cache 12 or the memory 14 by way of the bus controller 13 to the CPU 11 is latched by the instruction queue storage section 10 in the CPU 11 and then fed to an instruction execution section 19. This instruction queue storage section 10 is constituted to store only one instruction data ID.

The function of the central processing system shown in FIG. 2 and FIG. 3 will now be described. When receiving the read request signal IRW from the CPU 11, the cache 12 compares the instruction address IA output from the CPU 11 with the address of the instruction data ID stored in the cache 12. As a result of the comparison, if the addresses are not coincident with each other, the cache 12 returns the wait signal IWAIT to the CPU 11. When receiving the wait signal IWAIT, the CPU 11 waits until the instruction data ID of the requested instruction address IA is read from the memory 14 by way of the bus controller 13.

Generally, the instruction address IA supplied to the comparator 18 of the cache 12 delays due to the physical distance between the latch 17 of the CPU 11 and the comparator 18. Besides, in the conventional central processing system stated above, since the instruction address IA is once latched in the CPU 11 and then output to the cache 12, the cache 12 is further delayed in receiving the instruction address IA. Due to this, the cache 12 is delayed in returning the wait signal IWAIT to the CPU 11 and operation speed is disadvantageously slower, accordingly.

Figure 4:
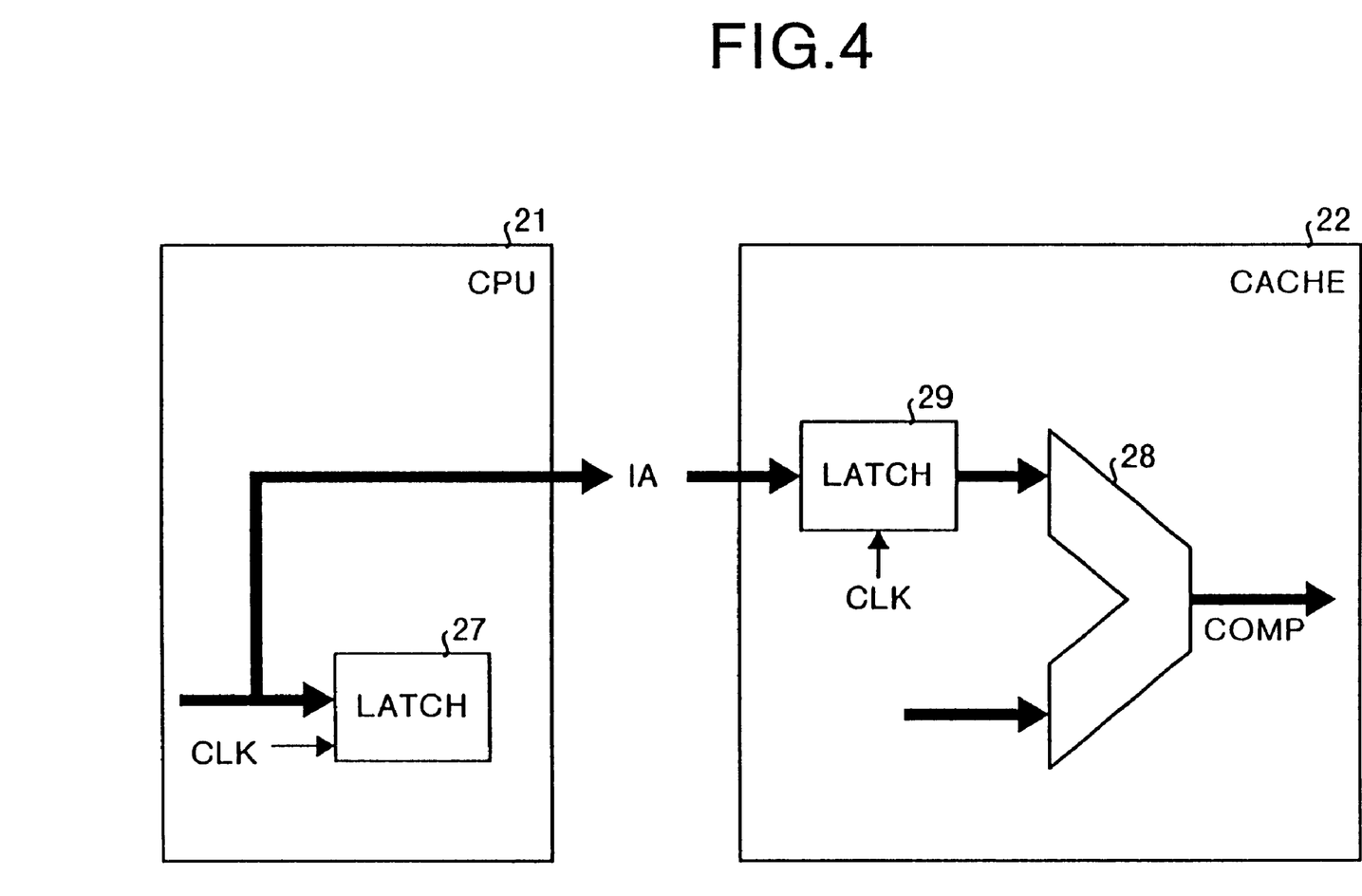
FIG. 4 is a block diagram showing the important constituent elements of a central processing system which adopts an address first-out method which elements relate to the instruction address of a CPU and a cache.

To prevent this, there is proposed increasing cache speed by directly feeding the output of the address adder in the CPU to the bus without temporarily latching the output. This is referred to as an address first-out method. FIG. 4 is a block diagram showing the important constituent elements of the central processing system adopting this address first-out method which elements relate to the instruction address of the CPU and the cache.

In the address first-out method, in the CPU 21, an address signal output from the address adder, which is not shown, is output to the cache 22 as an instruction address IA before being input into the latch 27. The instruction address IA output from the CPU 21 is latched by the latch 29 at timing at which a clock CLK rises and then supplied to the comparator 28 in the cache 22.

Figure 5:
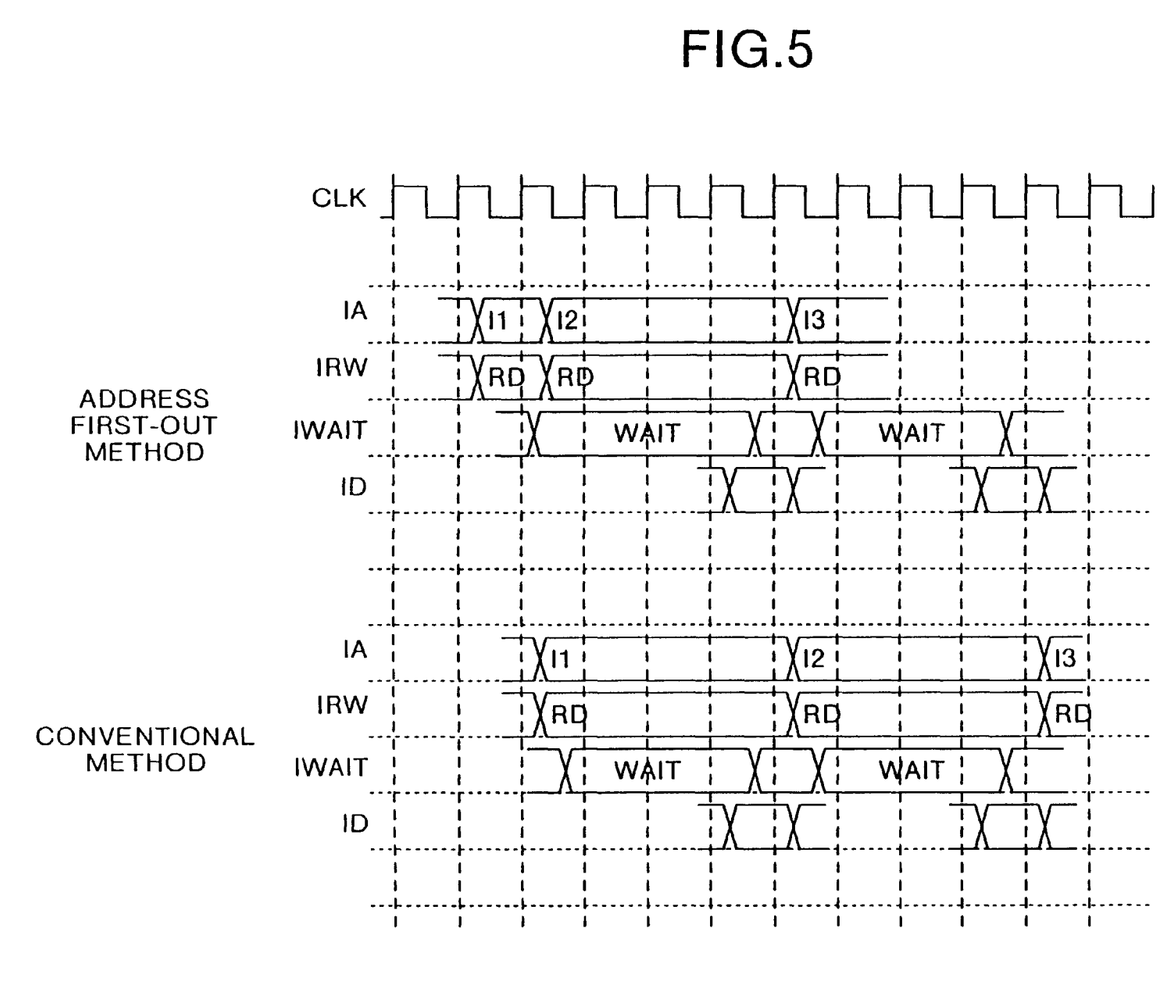
FIG. 5 is a timing chart showing each operation timing of the central processing system in the address first-out method and that in the conventional method.

As can be seen, in the address first-out method, the instruction address IA is output to the cache 22 at timing earlier than that of the conventional system. FIG. 5 shows the operation timing of an instruction read request in the address first-out method central processing system, and the operation timing of an instruction read request in the conventional central processing system which does not adopt the address first-out method. In FIG. 5, legends I1, I2 and I3 denote instruction addresses, legend RD denotes a read request signal and legend WAIT denotes a wait signal, which applies to all other figures.

Further, the instruction address IA supplied to the comparator 28 is delayed only by as much as the physical distance between the latch 29 in the cache 22 and the comparator 28. Namely, the instruction address IA is not affected by delay due to the physical distance between the CPU 21 and the cache 22. Therefore, the operation speed of the central processing system is prevented from being slower.

Figure 6:
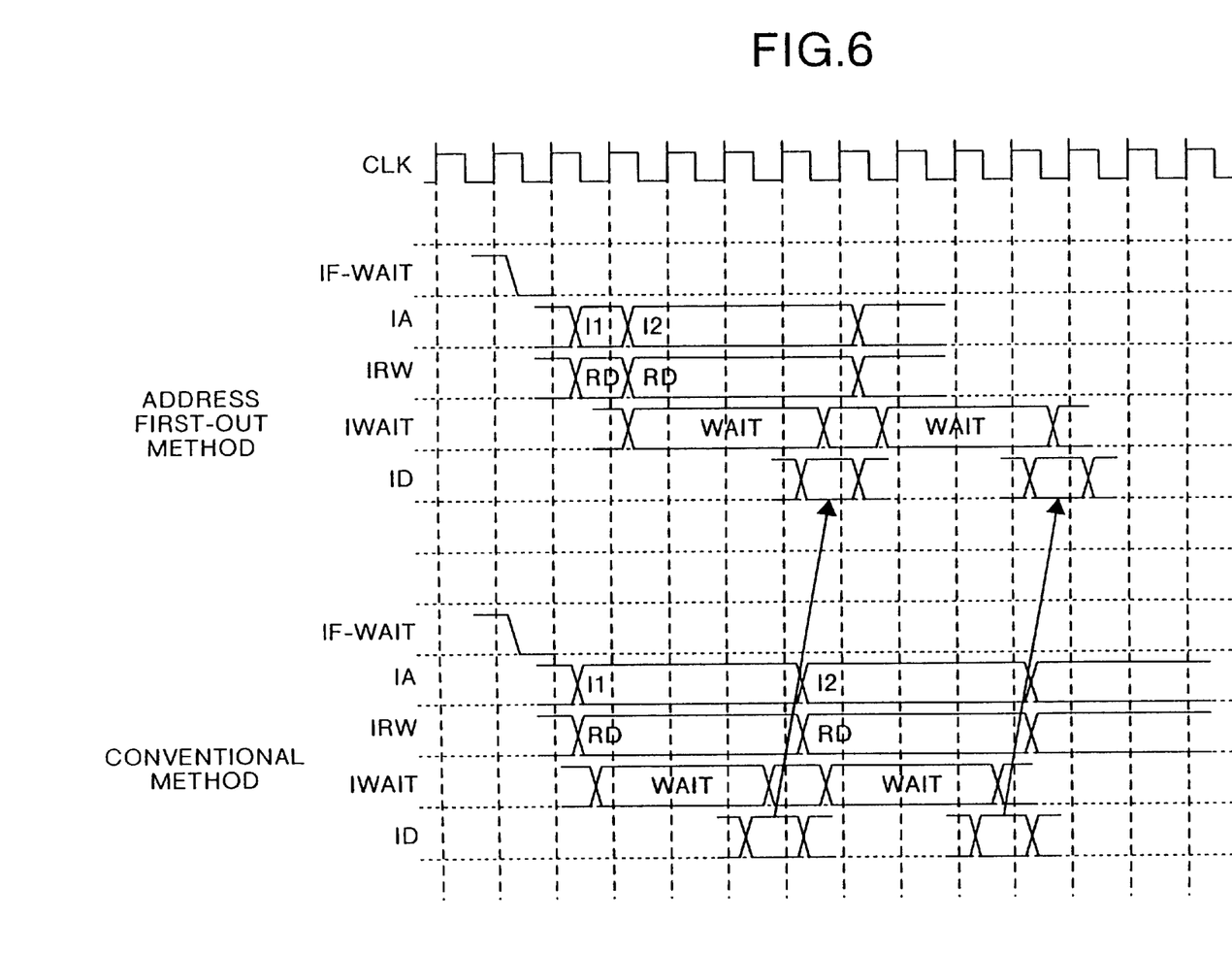
FIG. 6 is a timing chart showing each operation mode if fetch wait is output in the central processing system in the address first-out method and that in the conventional method.

Nevertheless, if a fetch wait signal for suppressing instruction fetch is output inside and fetch operation starts after waiting for the wait to be released in the address first-out method, the reading of the instruction data ID is disadvantageously delayed by one clock compared with the conventional system. FIG. 6 is a specific timing chart. FIG. 6 shows the operation timing of an instruction read request if a fetch wait signal is output in the address first-out method and the conventional method which does not adopt the address first-out method. In FIG. 6, legend IF-WAIT denotes a fetch wait signal for suppressing instruction fetch.

As shown in FIG. 6, in the address first-out method, after the fetch wait is released, the instruction address IA is latched at a clock CLK and then the wait signal IWAIT is returned. Due to this, compared with the conventional method, the wait signal IWAIT is returned at later timing than that for the conventional method by one clock. In the address first-out method, therefore, as indicated by arrows shown in FIG. 6, the instruction data ID is read from the memory later than the conventional method by one clock.

To solve the above-stated disadvantage with the address first-out method, forward fetching might be conducted. Because of the address first-out method, however, a maximum of requests corresponding to access twice, i.e., access during fetching and next first-out address are output to the bus. As a result, a branch instruction cannot be disadvantageously executed without two-bus access.

Figure 7:
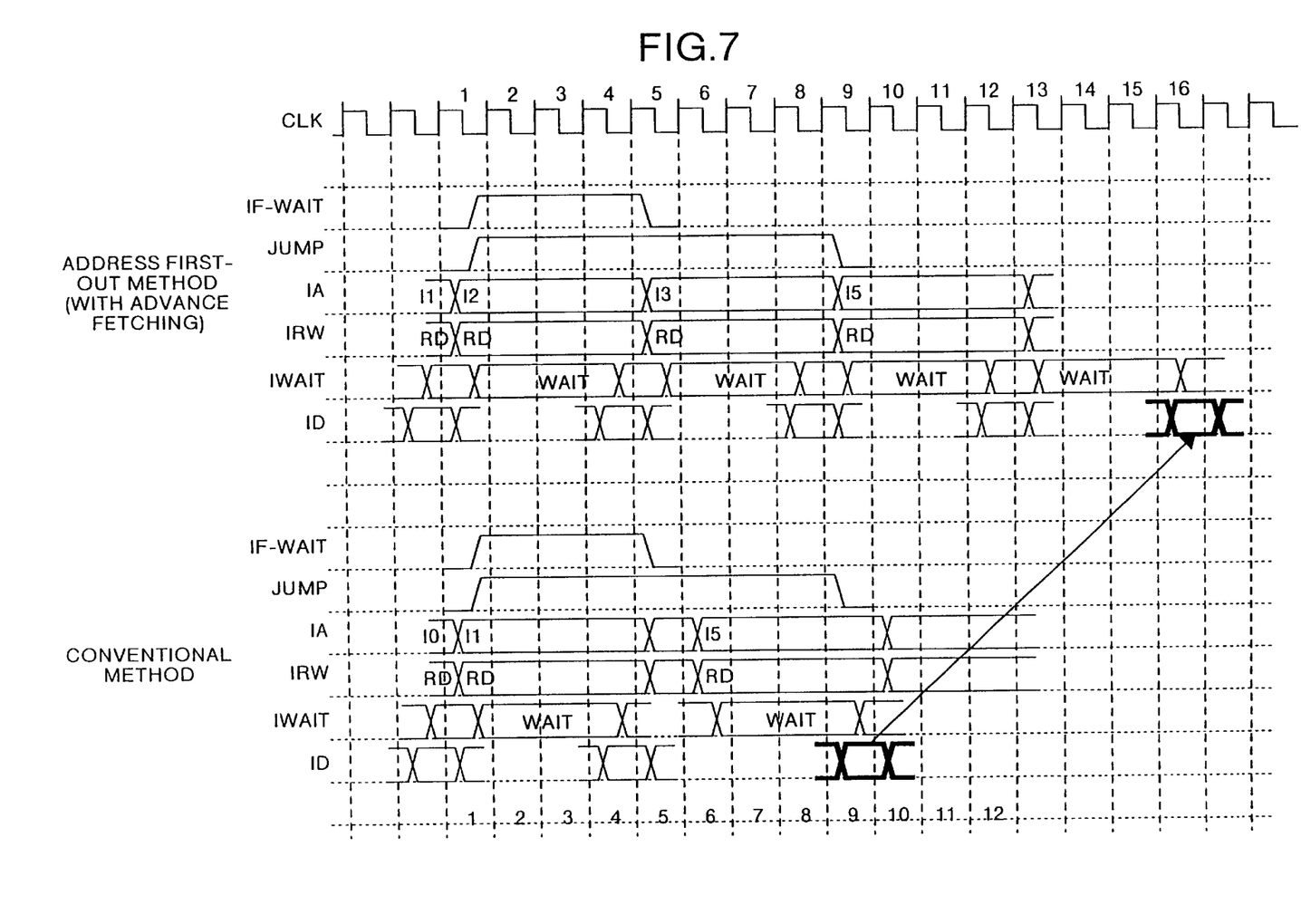
FIG. 7 is a timing chart showing each operation timing if a branch instruction is executed in the central processing system in the address first-out method and that in the conventional method.

FIG. 7 shows the operation timing of an instruction read request if a branch instruction is executed in the address first-out method which adopts advance fetching and in the conventional method which does not adopt the address first-out method. In FIG. 7, legend JUMP denotes a branch signal which indicates that branches exist in the CPU. In other words, it means that the addresses are discontinuous in that portion where the branches exists.

As shown in FIG. 7, in the conventional method, the fetch wait signal IF-WAIT is not output and the branch signal JUMP is output at a clock "5" in FIG. 7. The instruction address I5 of a branched part is output at a clock "6" in FIG. 7. On the other hand, in the address first-out method which adopts forward fetching, an instruction address I2 is latched by the cache at a clock "5" in FIG. 7 and a wait signal IWAIT is returned accordingly. Further, when it is requested to fetch an instruction address I3 by forward fetching, a branch processing is not executed until the wait signal IWAIT corresponding to the instruction address I3 is not output although the fetch wait signal IF-WAIT is not output.

In the address first-out method which adopts forward fetching, an instruction address IS of a branched part is output at a clock "9" in FIG. 7. Owing to this, in the address first-out system, instruction data ID corresponding to the instruction address I5 is read from the memory later than the conventional system by seven clocks as indicated by an arrow in FIG. 7.

SUMMARY OF THE INVENTION

It is an object of the present invention to improve delay compared with a conventional method when executing a branch instruction in a central processing unit and a central processing system having a forward fetching function in an address first-out method.

According to the central processing unit and a central processing system in an address first-out method and having an advance fetching function according to one aspect of the present invention, an instruction queue storage section is constituted out of a memory in a first-in first-out mode (FIFO memory). The number of instruction data stored in the instruction queue storage section is counted. When a count value of the counter is 0 or 1 and instruction fetch is not suppressed, a fetch request is issued.

Thus, a fetch request is not issued when instruction data is stored in instruction queue storage section. A fetch request is issued when the following conditions are satisfied. That is, fetch request is issued when a) instruction fetch is not suppressed and the instruction queue storage section will become empty if instruction data in the instruction queue storage section is executed next time, or b) the instruction queue storage section is empty. Accordingly, in the central processing unit and the central processing system in the address first-out method and having an advance fetching function, it is possible to improve delay compared with the conventional method when a branch instruction is executed.

Other objects and features of this invention will become apparent from the following description with reference to the accompanying drawings.

DESCRIPTION OF THE PREFERRED EMBODIMENTS

Figure 8:
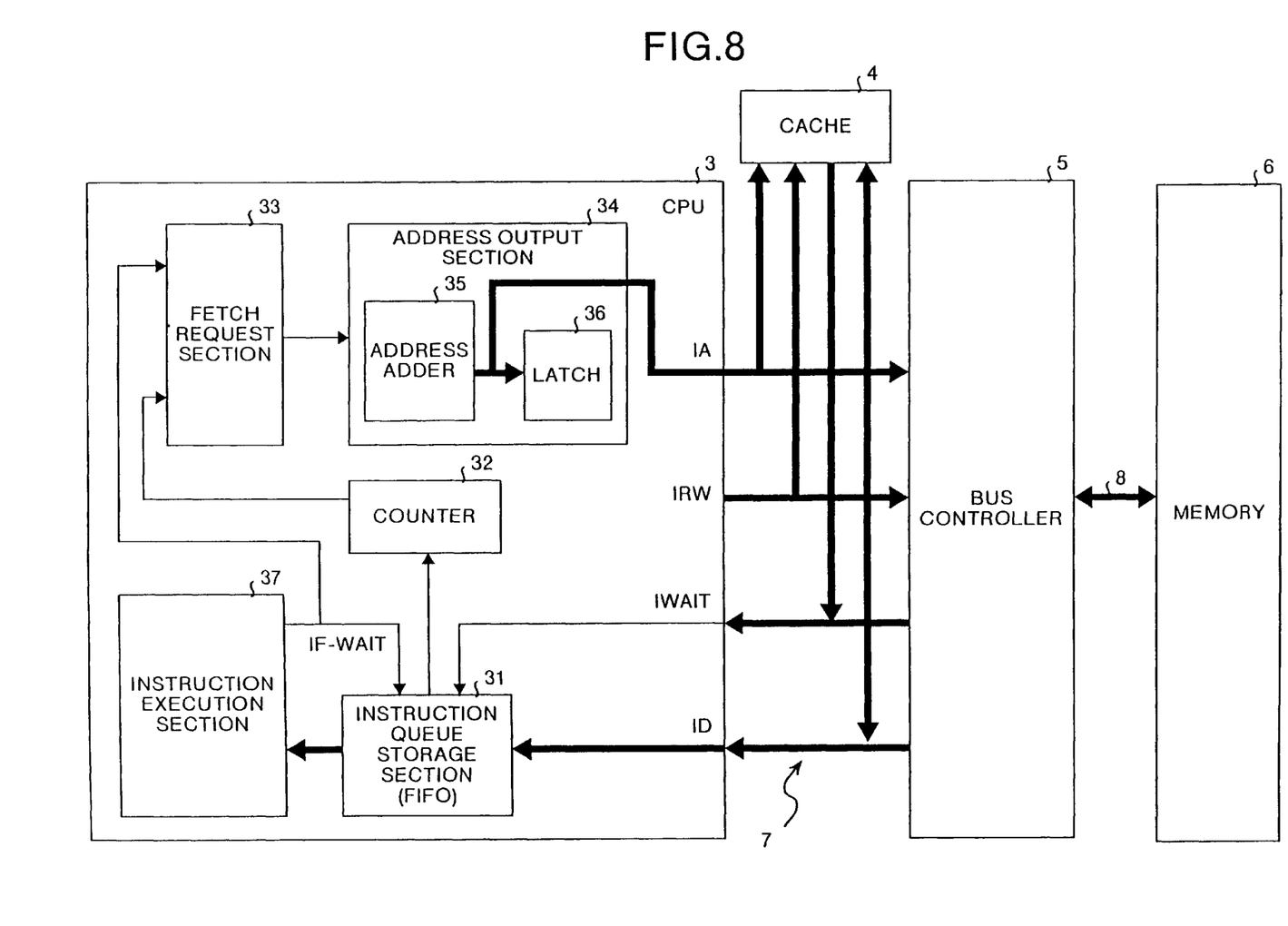
FIG. 8 is a block diagram showing an embodiment of a central processing system according to the present invention.

Preferred embodiment of the present invention will be described hereinafter in detail with reference to FIG. 8 through FIG. 12. FIG. 8 is a block diagram showing one example of a central processing system according to the present invention. This central processing system comprises a CPU 3, a cache 4, a bus controller 5 and a memory 6. The CPU 3, the cache 4 and the bus controller 5 are mutually connected through instruction buses (for signals IA, IRW, IWAIT and ID). The memory 6 is connected to the bus controller 5 through a bus 8.

The CPU 3 outputs an instruction address IA and a read request signal IRW to the cache 4 and to the bus controller 5. Furthermore, the CPU 3 receives a wait signal IWAIT or instruction data ID from the cache 4 and the bus controller 5. The CPU 3 further comprises an instruction queue storage section 31, a counter 32, a fetch request section 33, an address output section 34 and an instruction execution section 37.

The instruction queue storage section 31 is constituted to be capable of receiving the instruction data ID supplied from the memory 6 by way of the cache 4 or the bus controller 5 and storing a plurality of instruction data ID. The instruction queue storage section 31 outputs the stored instruction data ID to the instruction execution section 37 in the order in which the data ID are stored. The wait signal IWAIT is supplied to the instruction queue storage section 31 from the cache 4 or the bus controller 5. A fetch wait signal IF-WAIT is also supplied to the instruction queue storage section 31 from the instruction execution section 37. The instruction queue storage section 31 is constituted out of, for example, a memory in a first-in first-out method or FIFO memory.

The counter 32 counts the number of the instruction data ID stored in the instruction queue storage section 31 and outputs the count value, i.e., the number of instructions in the instruction queue storage section 31 to the fetch request section 33. The number of instructions in the instruction queue storage section 31 is the difference between the number of instruction data ID input into the instruction queue storage section 31 and the number of instruction data ID output from the instruction queue storage section 31.

The fetch request section 33 issues a fetch request when the fetch wait signal IF-WAIT is not output from the instruction execution section 37 and the count value of the counter 32 is either 0 or 1. This means that the CPU 3 has an advance fetching function.

The address output section 34 comprises an address adder 35 and a latch 36. The address output section 34 outputs the output of the address adder 35 to the cache 4 and the bus controller 5 as the next instruction address IA in response to the fetch request from the fetch request section 33. Namely, the CPU 3 adopts an address first-out method for outputting the instruction address IA without being latched by the latch 36.

Figure 9:
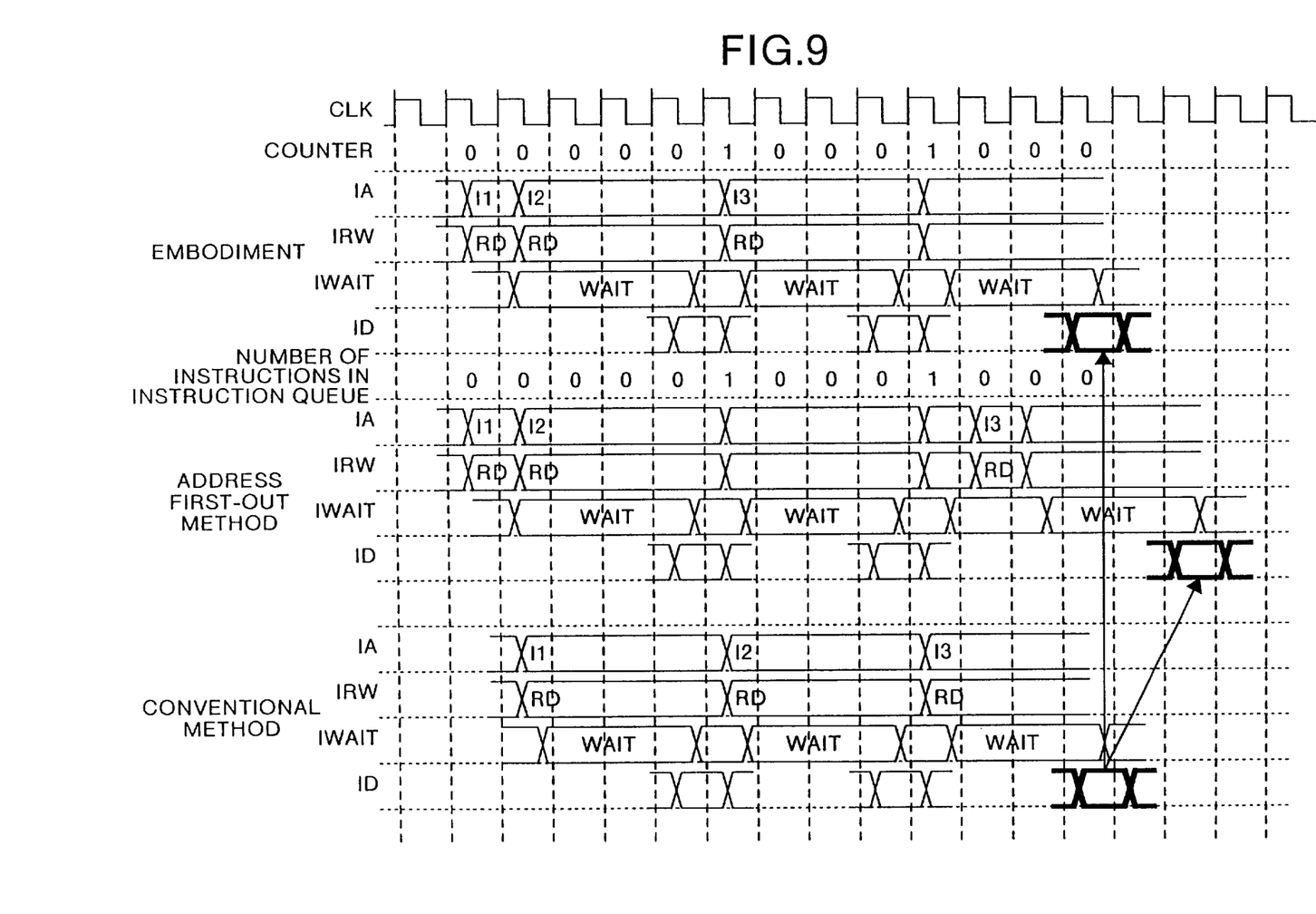
FIG. 9 is a timing chart showing each operation timing of the central processing system in this embodiment, that in an address first-out method and that in a conventional method.

Next, working of this embodiment will be described while making a comparison with the conventional method. FIG. 9 is a timing chart showing the operation timing of an instruction read request in each of the central processing system in this embodiment, that in the address first-out method and that in the conventional method.

As shown in FIG. 9, in the conventional method, a fetch request is issued when the fetch wait signal IF-WAIT signal is not output. In the address first-out method, by contrast, a fetch request is issued when the instruction queue storage section becomes empty. Due to this, instruction data ID corresponding to an instruction address I3 is read from the memory 6 later than the conventional method by two clocks.

On the other hand, in this embodiment, a fetch request is issued when the fetch wait signal IF-WAIT is not output and the counter value of the counter 32 is either 0 or 1. Due to this, instruction data ID corresponding to an instruction address I3 is read from the memory 6 earlier than the address first-out method (see FIG. 9 by two clocks. Therefore, this embodiment does not have any delay from the conventional method.

Figure 10:
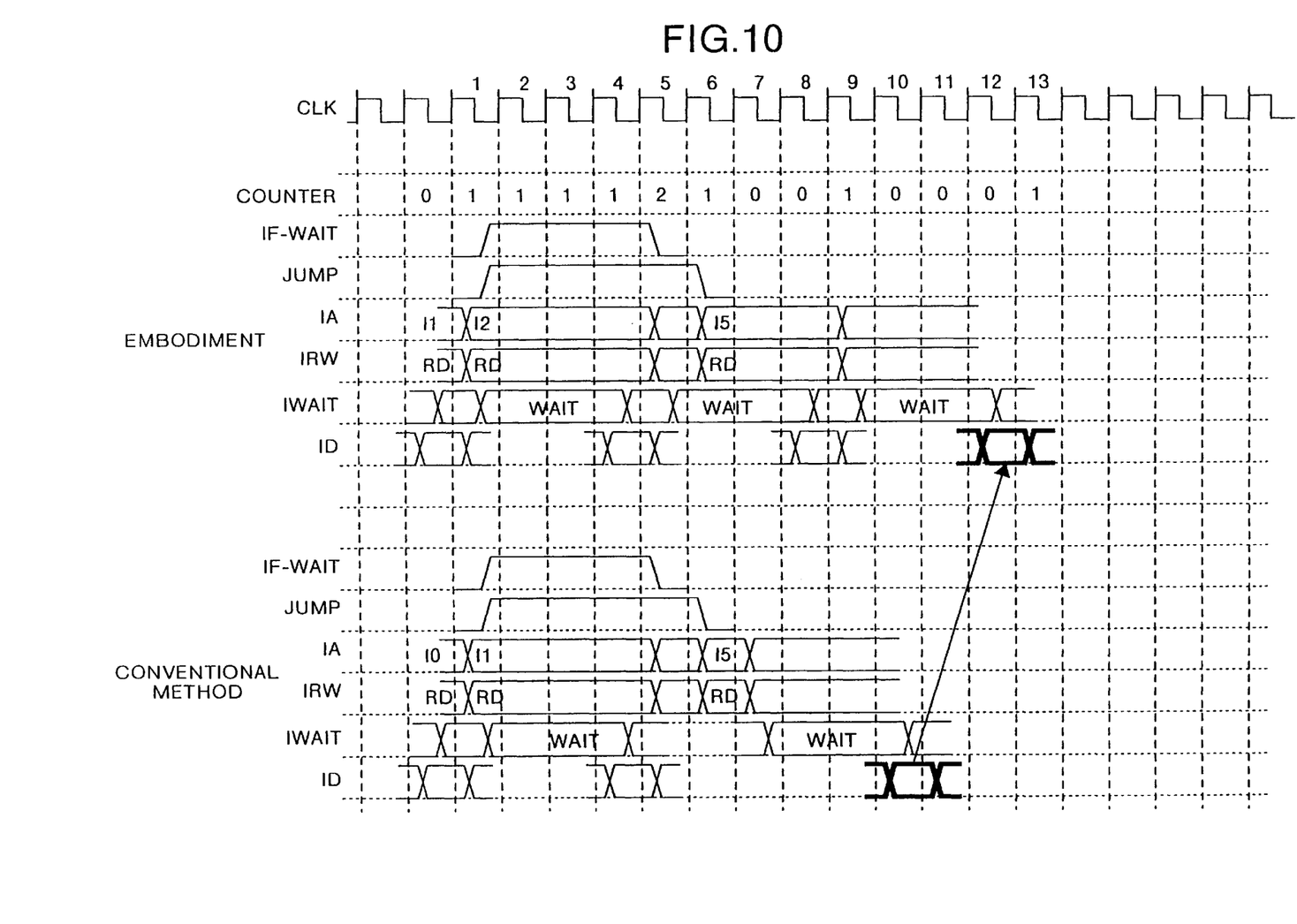
FIG. 10 is a timing chart showing each operation timing if a branch instruction is executed in the central processing system in this embodiment and that in the conventional method.

FIG. 10 is a timing chart showing the operation timing of an instruction read request if a branch instruction is executed in each of the central processing system in this embodiment and that in the conventional method. In the example shown in FIG. 10, a fetch wait signal IF-WAIT and a branch signal JUMP are output at a clock "1" shown in FIG. 10 and the fetch wait signal IF-WAIT is not output from a clock "5". The branch signal JUMP is not output from a clock "6" shown in FIG. 10.

In the conventional method, an instruction address I5 of a branched part is output at a clock "6" shown in FIG. 10. Then, a wait signal corresponding to the instruction address I5 is returned and instruction data ID corresponding to the instruction address I5 is read at a clock "10". On the other hand, in this embodiment, the instruction address I5 of a branched part is output at clock "6". However, the instruction address I2 of a clock is output at clock "1". In this embodiment, therefore, instruction data ID corresponding to the instruction address I5 is read at clock "12" one-bus access later.

That is to say, in this embodiment, the instruction data ID corresponding to the instruction address I5 of the branched part is read from the memory 6 later than the conventional method by two clocks. Here, as already described above with reference to FIG. 7, in the central processing system of an address first-out method which adopts advance fetching, if a branch instruction is executed, the instruction data ID corresponding to the instruction address I5 is read from the memory later than the conventional type by seven clocks. In this embodiment, therefore, it is possible to execute the branch instruction earlier than the address first-out method which adopts advance fetching by five clocks.

Figure 11:
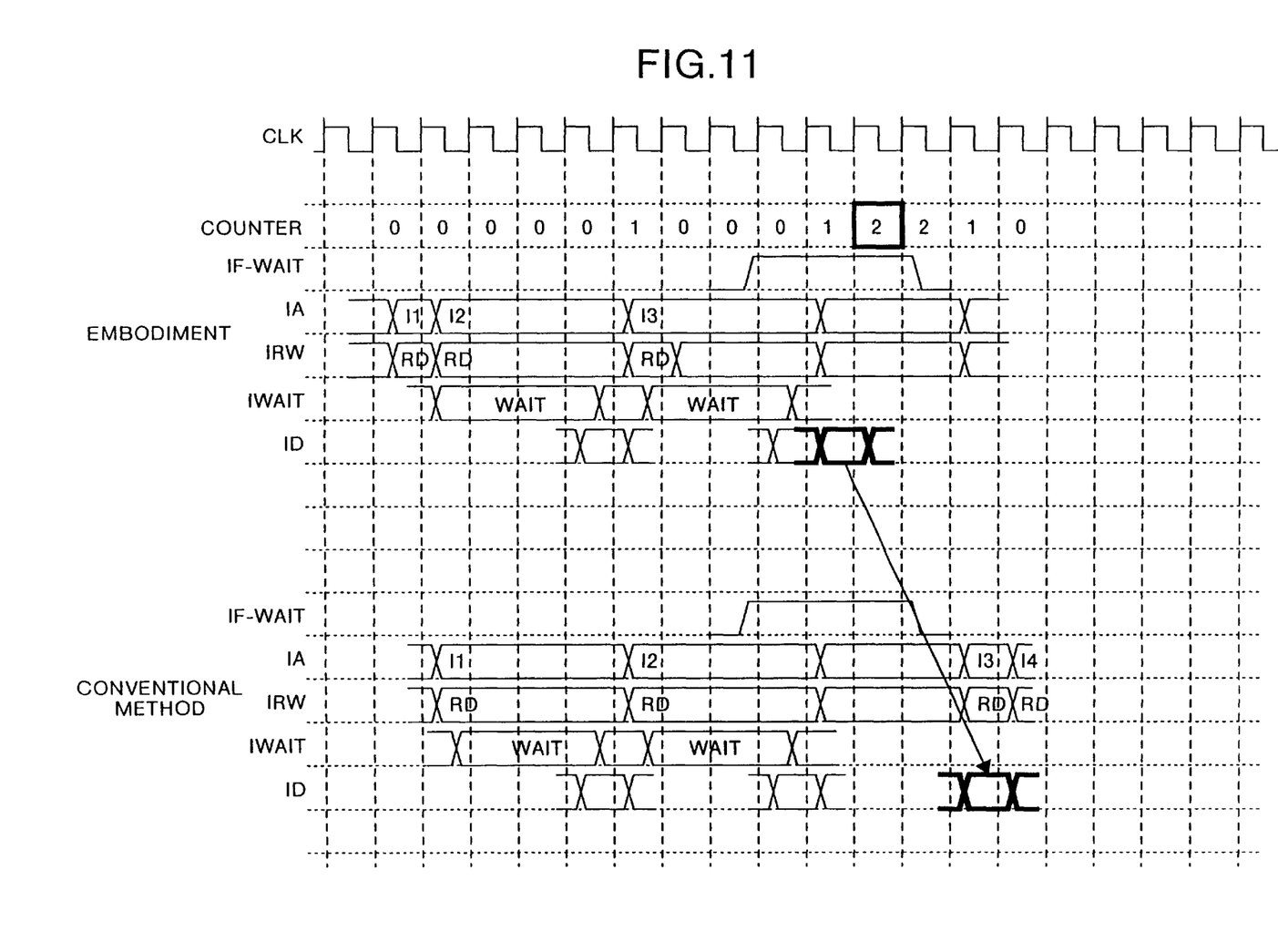
FIG. 11 is a timing chart showing each operation timing of an instruction read request if an instruction queue storage section stores instruction data in the central processing system in this embodiment and that in the conventional method.
Figure 12:
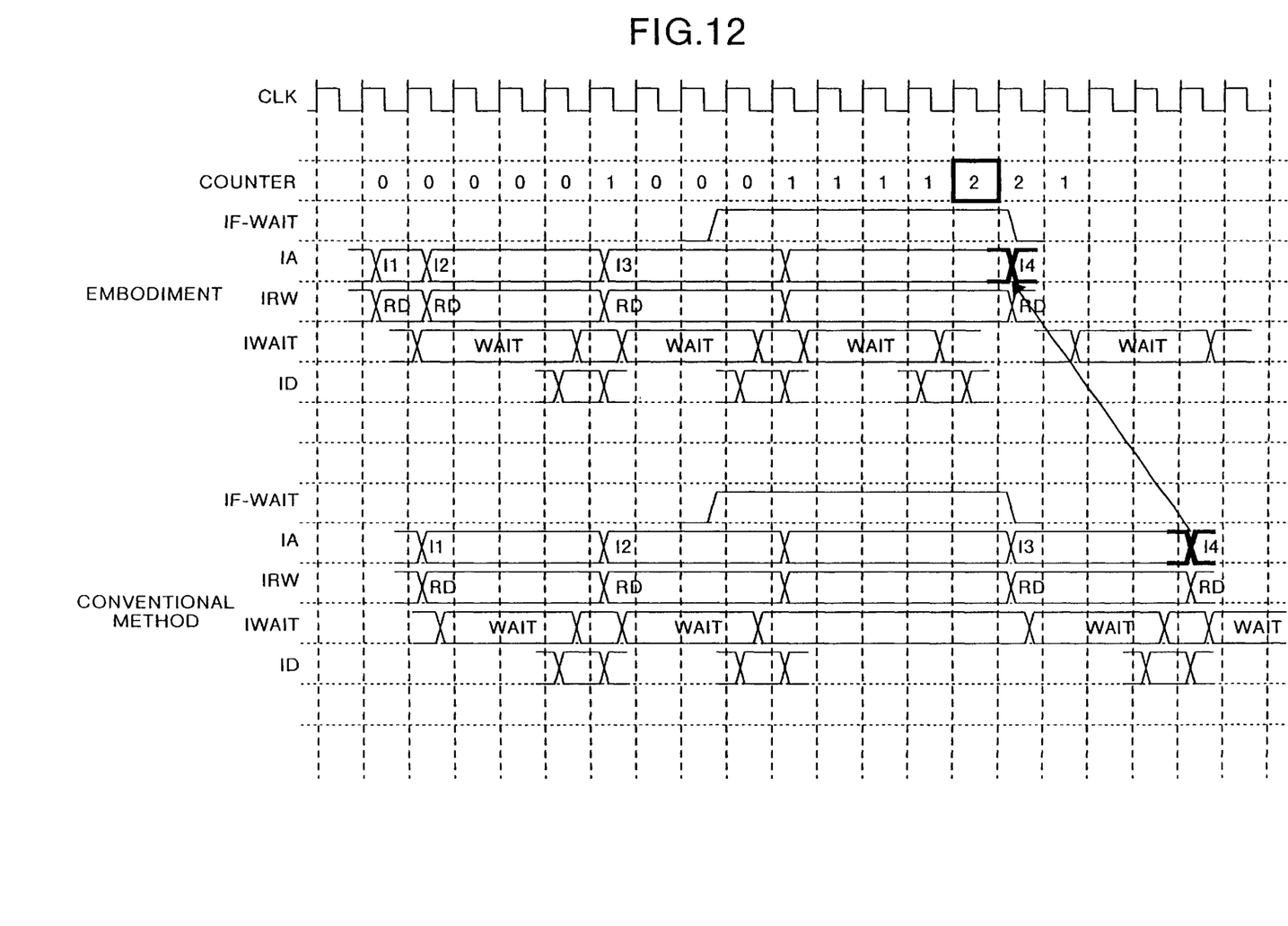
FIG. 12 is a timing chart showing each operation timing of an instruction read request if an instruction queue storage section stores instruction data in the central processing system in this embodiment and that in the conventional method.

FIG. 11 and FIG. 12 are timing charts showing the operation timing of an instruction read request if the instruction queue storage section stores instruction data in each of the central processing system in this embodiment and that in the conventional method. FIG. 11 shows a case where no wait is applied to an instruction address I3 and FIG. 12 shows a case where wait is applied to the instruction address I3.

As can be seen in FIG. 11, in the conventional method, the instruction queue storage section can store only one instruction data ID. Accordingly, even if a fetch wait signal IF-WAIT is output and the instruction execution section cannot process instructions, instruction ID corresponding to, for example, an instruction address I2 can be stored in the instruction queue storage section. In that case, however, the next instruction address I3 cannot be output unless the instruction execution section turns into a state in which the section can process instructions and executes the instruction data ID corresponding to the instruction address I2.

On the other hand, in this embodiment, because of the address first-out method, the CPU 3 outputs an instruction address IA earlier than the conventional method by one clock and the instruction data ID is, therefore, often returned earlier than that in the conventional method. In the example shown in FIG. 11, for instance, the instruction data ID in this embodiment is returned earlier than that in the conventional method by three clocks. Thus, even if the fetch wait signal IF-WAIT is output and the instruction execution section 37 cannot process instructions, a plurality of instruction data ID are often returned. Then, in this embodiment, the returned plurality of instruction data ID are stored in the instruction queue storage section 31 constituted out of the FIFO memory until the instruction execution section 37 turns into a state in which the section 37 can process instructions.

Further, as shown in FIG. 12, in the conventional method, while a fetch wait signal IF-WAIT is output, the instruction data ID corresponding to the instruction address I2 is stored in the instruction queue storage section. When the instruction execution section turns into a state in which the section can process instructions, the instruction data ID corresponding to the instruction address I2 is executed by the instruction execution section. Thereafter, the next instruction address I3 is output, instruction data ID corresponding to the instruction address I3 is read and then the next instruction address I4 is output.

On the other hand, in this embodiment, while a fetch wait signal is output and the instruction execution section 37 cannot process instructions, instruction data ID corresponding to, for example, the instruction addresses I2 and I3 are stored in the instruction queue storage section 31. When the instruction execution section 37 turns into a state in which the section 37 can process instructions, the instruction data ID corresponding to the instruction address I2 and that corresponding to the instruction address I3 are executed by the instruction execution section 37. In this embodiment, therefore, the next instruction address I4 is output earlier than that in the conventional method by, for example, four clocks. Thus, in this embodiment, it is possible to access the instruction data ID corresponding to the instruction address I4 earlier than that in the conventional method by three clocks.

According to the present embodiment, when a fetch wait signal IF-WAIT is not output, i.e., the instruction execution section 37 is in a state in which the section 37 can process instructions and the count value of the counter 32 is either 0 or 1, i.e., the instruction queue storage section 31 is empty or the instruction queue storage section 31 becomes empty if instruction data ID in the instruction queue storage section 31 is executed next time, a fetch request is issued. Accordingly, in the central processing unit and the central processing system in an address first-out method and having an advance fetching function, it is possible to improve delay compared with the conventional method when a branch instruction is executed.

The present invention should not be limited to the above-stated embodiment and the design thereof can be changed in various manner. Further, the timing charts shown are provided for illustrative purposes and may be changed according to circumstances involved.

According to the present invention, a fetch request is issued when a) instruction fetch is not suppressed and the instruction queue storage section will become empty if instruction data in the instruction queue storage section is executed next time, or b) the instruction queue storage section is empty. Accordingly, in the central processing unit and the central processing system in an address first-out method and having an advance fetching function, it is possible to improve delay compared with the conventional method when a branch instruction is executed.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A central processing unit comprising:
   an instruction queue storage section which stores instruction data supplied from outside of said central processing unit and outputs the instruction data in an order in which the instruction data was stored;
   a counter which counts the number of the instruction data stored in said instruction queue storage section;
   a fetch request section which outputs a fetch request when a count value of the counter is 0 or 1;
   an address output section which directly outputs a next instruction address output from an address adder to the outside when said fetch request section outputs the fetch request; and
   an instruction execution section which reads the instruction data stored in said instruction queue storage section and executes the instruction data.

2. The central processing unit according to claim 1, wherein said instruction queue storage section is made from FIFO memory.

3. The central processing unit according to claim 1, wherein said counter increments the counter value by one when said instruction queue storage section receives an instruction datum from outside, and decrements the counter value by one when said instruction execution section reads an instruction datum from said instruction queue storage section.

4. The central processing unit according to claim 1, wherein said fetch request section issues the fetch request when instruction fetch is not suppressed by said instruction execution section.

5. A central processing system comprising:
   a cache;
   a memory;
   an instruction queue storage section which stores instruction data supplied from outside of said central processing unit and outputs the instruction data in an order in which the instruction data was stored;
   a counter which counts the number of the instruction data stored in said instruction queue storage section;
   a fetch request section which outputs a fetch request when a count value of the counter is 0 or 1;
   an address output section which directly outputs a next instruction address output from an address adder to said cache or to said memory based on the fetch request from said fetch request section; and
   an instruction execution section which reads the instruction data stored in said instruction queue storage section and executes the instruction data.

6. The central processing system according to claim 5, wherein said instruction queue storage section is made from FIFO memory.

7. The central processing system according to claim 5, wherein said counter increments the value by one when said instruction queue storage section receives an instruction datum from outside, and decrements the value by one when said instruction execution section reads an instruction datum from said instruction queue storage section.

8. The central processing system according to claim 5, wherein said fetch request section issues the fetch request when instruction fetch is not suppressed by said instruction execution section.

* * * * *